United States Patent
Choi

(10) Patent No.: US 7,609,339 B2
(45) Date of Patent: Oct. 27, 2009

(54) VIEWING-ANGLE CONTROLLABLE COLOR FILTER SUBSTRATE, LIQUID CRYSTAL DISPLAY HAVING THE SAME, AND MANUFACTURING METHOD THEREOF

(75) Inventor: Sang Ho Choi, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 306 days.

(21) Appl. No.: 11/643,783

(22) Filed: Dec. 22, 2006

(65) Prior Publication Data

US 2008/0002110 A1  Jan. 3, 2008

(30) Foreign Application Priority Data

Jun. 29, 2006  (KR) ...................... 10-2006-0059993

(51) Int. Cl.
*G02F 1/1335* (2006.01)
(52) U.S. Cl. ...................................... 349/106; 349/104
(58) Field of Classification Search ................. 349/104, 349/106–109
See application file for complete search history.

(56) References Cited

U.S. PATENT DOCUMENTS

2005/0174529 A1  8/2005 Fukushima et al.
2007/0097293 A1*  5/2007 Nakanishi et al. ............. 349/95

FOREIGN PATENT DOCUMENTS

CN  1651981 A  8/2005

* cited by examiner

*Primary Examiner*—Kevin S Wood
(74) *Attorney, Agent, or Firm*—McKenna Long & Aldridge LLP

(57) ABSTRACT

A viewing-angle controllable color filter substrate includes: a display layer includes a plurality of openings separated from each other, shading regions disposed between openings that displays images; and a viewing angle control layer with an electrochromic pattern. A manufacturing method of a liquid crystal display includes: forming a display layer on an upper substrate and a viewing angle control layer including an electrochromic pattern; forming on a lower substrate a plurality of pixel regions arranged in a matrix; and forming a liquid crystal layer.

23 Claims, 13 Drawing Sheets

VIEWING-ANGLE CONTROLLABLE COLOR FILTER SUBSTRATE, LIQUID CRYSTAL DISPLAY HAVING THE SAME, AND MANUFACTURING METHOD THEREOF

This application claims the benefit of Korean Patent Application No. 10-2006-059993 filed on Jun. 29, 2006, which is hereby incorporated by reference for all purposes as if fully set forth herein.

BACKGROUND OF THE INVENTION

1. Field of the Invention

The present invention relates to a liquid crystal having a color filter substrate and a manufacturing method thereof.

2. Discussion of the Related Art

A liquid crystal display is a display device in which a liquid crystal layer having an anisotropic dielectric constant is formed between upper and lower substrates, which are transparent insulating substrates, and the intensity of an electric field formed on the liquid crystal material is controlled so that the molecular arrangement of the liquid crystal material changes, thereby controlling the amount of light transmitted to the upper substrate serving as a display surface, resulting in the display of desired images.

A representative example of such an LCD includes a thin-film transistor liquid crystal display (TFT LCD) using a TFT as a switching device.

FIGS. 1 and 2 are block diagrams representing a liquid crystal display according to the related art that illustrate viewing-angle controllable liquid crystal displays operated in a wide viewing angle mode and a narrow viewing angle mode, respectively.

The basic principle of the viewing angle control method as shown in FIGS. 1 and 2 is as follows.

First, a liquid crystal panel with a transverse electric field structure is constructed for image display, another liquid crystal panel for viewing angle control is added to an upper or lower part of the liquid crystal panel, and then the added liquid crystal panel is operated to control wide and narrow viewing angle modes. The liquid crystal panel added for viewing angle control basically has the function of preventing the interference with the wide viewing angle characteristics of the liquid crystal panel displaying images and the function of inducing a narrow viewing angle when security and privacy are required.

In FIGS. 1 and 2, the liquid crystal panel including a first liquid crystal layer 80 is a panel for controlling a viewing angle, while the liquid crystal panel including a second liquid crystal layer 90 is a panel displaying images so as to have a wide viewing angle. If a voltage is not applied to the first liquid crystal layer 80, liquid crystal molecules 81 are arranged in parallel between two substrates 10 and 21, and the original wide viewing angle is sustained, thereby resulting in a wide viewing angle mode. If a voltage is applied to the first liquid crystal layer 80, the liquid crystal molecules 81 are arranged perpendicularly between the two substrates 10 and 21 and the viewing angle decreases, thereby resulting in a narrow viewing angle mode.

Referring to FIGS. 1 and 2, first, second, third, and fourth substrates 10, 21, 22, and 30 are disposed in parallel to each other, and transparent electrodes 60 and 70 are respectively formed on inner surfaces between the first substrate 10 and the second substrate 21 and face each other, and two linear electrodes 40 and 50 are formed in parallel to each other on the top surface of the third substrate 22.

First and second liquid crystal layers 80 and 90 are formed between the first substrate 10 and the second substrate 21 and between the third substrate 22 and the fourth substrate 30, respectively.

The liquid crystal panel including the first and second substrate 10 and 21 and the first liquid crystal layer 80 disposed between the two substrates 10 and 21 is a liquid crystal panel for use in viewing angle control that may control a wide viewing angle and a narrow viewing angle.

When an electric field is not applied, as shown in FIG. 1, the liquid crystal molecules of the first liquid crystal layer 80 are aligned parallel to the first and second substrates 10 and 20. In the wide viewing angle mode as shown in FIG. 1, the liquid crystal molecules 91 of the second liquid crystal layer 90 are aligned in the same direction as above, thus obtaining the same viewing angle as the wide viewing angle of a typical liquid crystal display with a horizontal electric field structure having one liquid crystal panel, and not affecting the other characteristics of the horizontal electric field structure.

Two polarizing plates 11 and 31 for polarizing passing light are attached to outer surfaces of the first substrate 10 and third substrate 30, respectively. The transmission axis direction of the polarizing plates 11 and 31 is disposed to be perpendicular or parallel to the orientation direction of the liquid crystal molecules 81 and 91.

FIG. 2 illustrates a case in which the liquid crystal display of FIG. 1 is used in a narrow viewing angle mode.

When a voltage is applied to two transparent electrodes 70 and 60 to form a vertical electric field between the first and second substrates 10 and 21, the liquid crystal molecules 81 of the first liquid crystal layer 80 are arranged perpendicularly to the two substrates 10 and 21 along the direction of the electric field. At this time, the liquid crystal molecules 82 adjacent to the two substrates 10 and 21 are arranged in parallel to the two substrates 10 and 21 because an alignment force caused by rubbing is larger than the force of the electric field.

In such a narrow viewing angle mode, the liquid crystal molecules 81 arranged perpendicularly to the two substrates 10 and 21 do not affect retardation with respect to light proceeding to the front surface of the two substrates 10 and 21.

However, as linearly polarized light passes through the first liquid crystal layer 80 formed of the liquid crystal molecules 81, the polarization state is changed by retardation. The difference in the ratio of change in polarization state becomes more severe as the light is farther away from the front surface. Thus, the contrast ratio is reduced, resulting in a narrow viewing angle.

That is, the viewing angle of the liquid crystal display is reduced by applying an electric field to the first liquid crystal layer 80 added for the purpose of viewing angle control, thereby narrowing the viewing angle.

In this manner, it is possible to switch between the narrow viewing angle mode and the wide viewing angle mode using one liquid crystal display, so the viewing angle characteristics may be adapted as needed.

However, when the viewing angle characteristics of the liquid crystal display are adjusted by means of such a structure, another liquid crystal panel for controlling a viewing angle is used in addition to the liquid crystal panel for displaying images.

Therefore, the overall thickness of the liquid crystal display is excessively increased, thereby incurring additional costs and manufacturing processes and making it difficult to perform the processes such as rubbing, scribing, substrate assembly, etc.

SUMMARY

Accordingly, the present invention is directed to a viewing-angle controllable color filter substrate, a liquid crystal device having the same, and a manufacturing method thereof that substantially obviates one or more of the problems due to limitations and disadvantages of the related art.

An advantage of the present invention is to provide a viewing angle of a substrate that allows for a reduced thickness of the liquid crystal display.

Another advantage of the present invention is to provide for a simplified manufacturing process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color filter substrate includes: a display layer includes a plurality of openings separated from each other, shading regions disposed between the openings that displays images, color filters in the openings, and a black matrix in the shading regions; and a viewing angle control layer with an electrochromic pattern that adjusts the transmission/interception of light incident from wide viewing angles depending on a magnitude of a voltage applied to the electrochromic pattern.

In another aspect of the present invention, a liquid crystal display includes: an upper substrate having a display layer that displays images and a viewing angle control layer whose transmissivity changes depending on the magnitude of a voltage applied thereto that adjusts the transmission/interception of light incident from wide viewing angles; a lower substrate facing the upper substrate having a plurality of pixel regions arranged in a matrix; and a liquid crystal layer between the upper substrate and the lower substrate.

In another aspect of the present invention, a manufacturing method of a liquid crystal display, including step of: a) forming a display layer on an upper substrate that displays images and a viewing angle control layer whose transmissivity changes depending on the magnitude of a voltage applied thereto that adjusts the transmission/interception of light incident from wide viewing angles; b) forming on a lower substrate a plurality of pixel regions arranged in a matrix; and c) forming a liquid crystal layer between the upper substrate and the lower substrate, and assembly of the upper substrate and the lower substrate.

It is to be understood that both the foregoing general description and the following detailed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
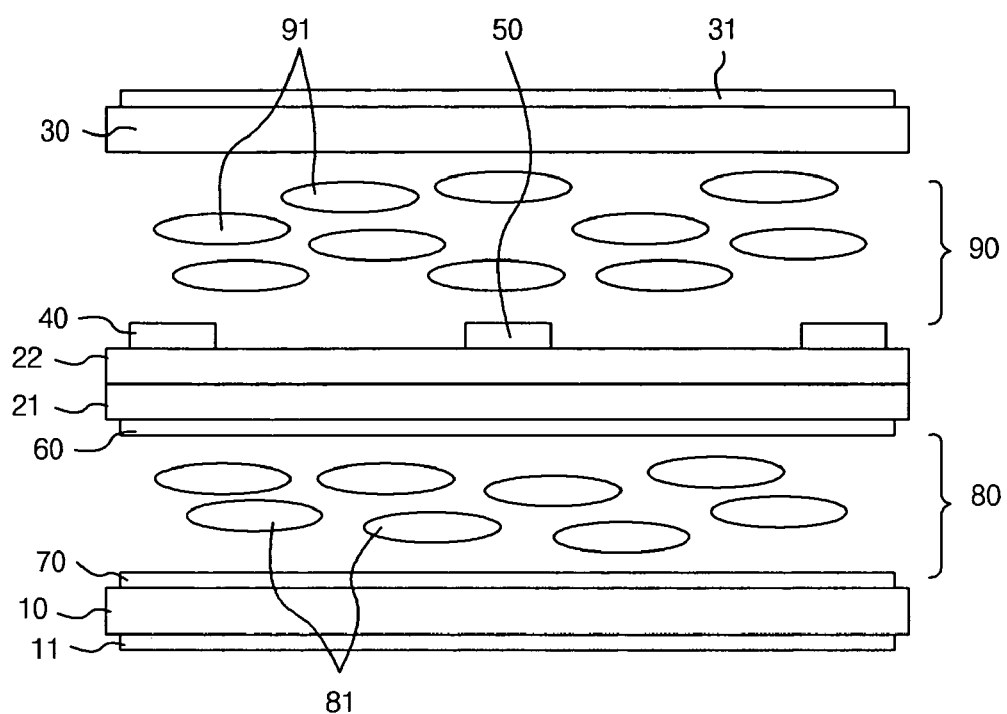
FIGS. 1 and 2 are block diagrams representing a liquid crystal display according to the related art.
Figure 2:
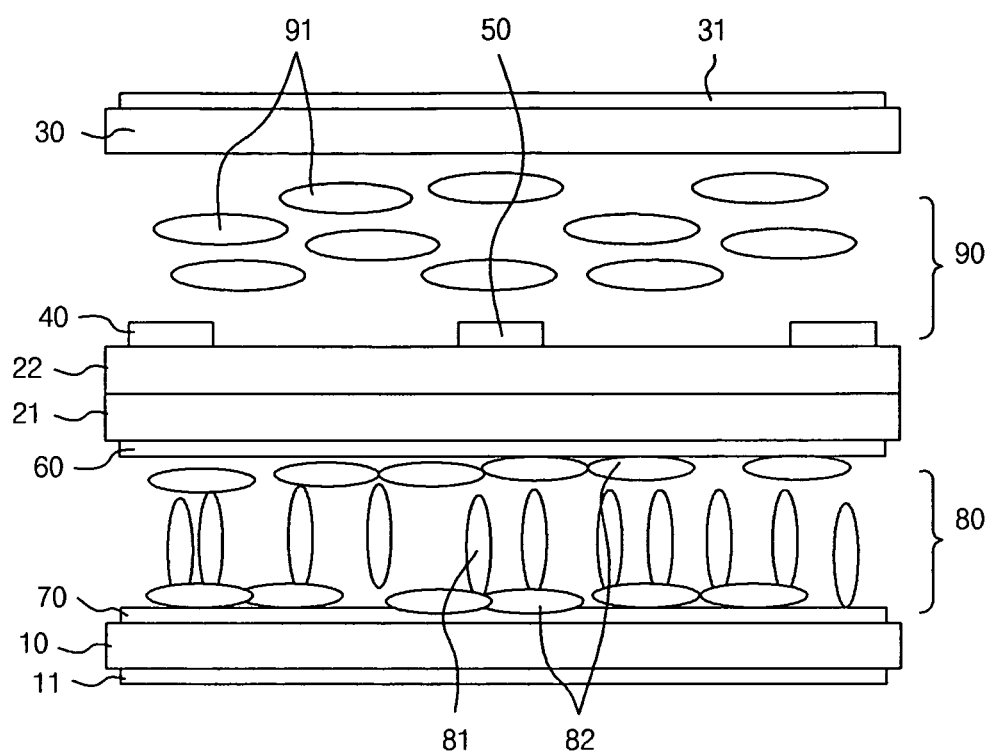
Figure 3:
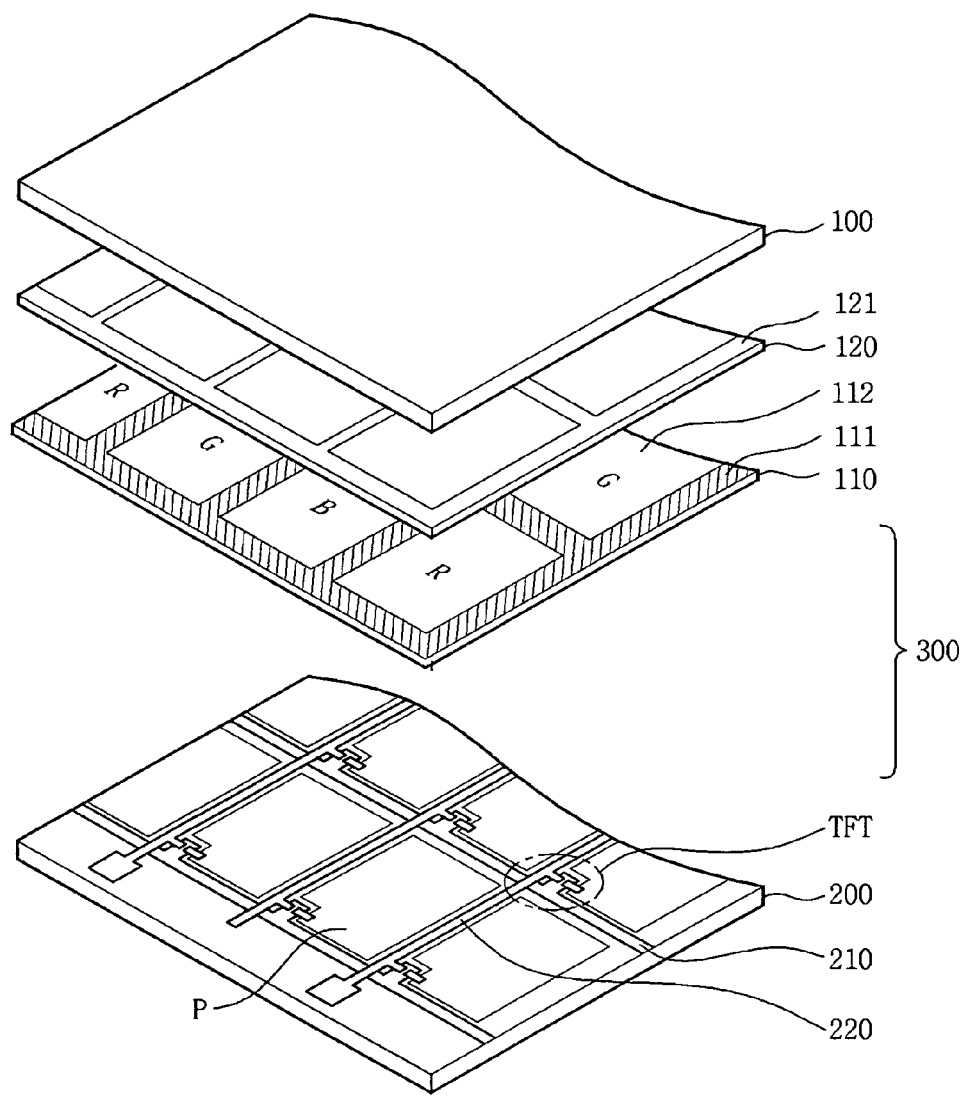
FIG. 3 is an exploded perspective view of a liquid crystal display according to a first embodiment of the present invention.

FIG. 3 is an exploded perspective view of a liquid crystal display according to a first embodiment of the present invention.

Referring to FIG. 3, a liquid crystal display according to a first embodiment of the present invention may include an upper substrate 100 and a lower substrate 200 attached to each other with a predetermined gap, and a liquid crystal layer formed between the upper substrate 100 and the lower substrate 200.

For example, the upper substrate 100 is a color filter substrate and may include shading regions made with a black matrix 111 having openings formed therein with color filters of red, green, and blue (R,G,B) formed in the openings.

The display layer 110 may include black matrix 111 for intercepting light in the shading regions, which are the portions excluding the openings corresponding to pixel regions P, and may include color filters 112 of red, green, and blue (R,G,B) for color reproduction so as to correspond to the pixel regions P, respectively.

The lower substrate 200 may be an array substrate on which thin film transistors (TFT) formed may include a plurality of pixel regions P arranged in a matrix.

The lower substrate 200 may include a plurality of gate lines 210 spaced a predetermined distance from each other and formed in one direction and a plurality of data lines 220 formed in a direction substantially perpendicular to the gate lines 210 with the pixel regions P defined by the gate lines 210 and the data lines 220 crossing each other.

Thin film transistors (TFTs) may be formed at the crossings of the gate lines 210 and the data lines 220. The thin film transistors (TFTs) positioned at the crossings may apply data voltages applied to the data lines 220 to the pixel regions P, respectively, in response to scan signals from the gate lines 210.

The display device may include a material having an adjustable transmissivity. A viewing angle control layer 120 may be switched between a wide viewing mode and a narrow viewing angle mode. For example, a barrier type electrochromic pattern 121 having a height in a vertical direction laminated thereon may be switched between a wide viewing angle mode and a narrow viewing angle mode according to whether an electric field is applied to the electrochromic pattern 121 or not.

In the wide viewing angle mode, the electrochromic pattern 121 becomes more transparent, while in the narrow viewing angle mode, the electrochromic pattern 121 becomes more opaque, and operates so as to cut off the viewing angle.

In the wide viewing angle mode where the viewing angle control layer 120 keeps the transparent state, the viewing angle control layer 120 has to implement a wide viewing angle, so it is efficient for such a liquid crystal display according to the first embodiment of the present invention to employ an IPS (In-Plane Switching) structure or a VA (Vertical Alignment) structure.

In the IPS structure, a common electrode and a pixel electrode substantially parallel to each other are disposed on the pixel regions P of the lower substrate 200 so as to have a linear or bent structure, the liquid crystal molecules are horizontally arranged, and the orientation of the liquid crystal molecules is controlled by a horizontal electric field formed between the two electrodes.

In the VA structure, the initial orientation of liquid crystal molecules is vertically aligned on a substrate, and a common electrode and a pixel electrode are formed on the upper and lower substrates 100 and 200, respectively, to apply a vertical electric field to the liquid crystal molecules.

Figure 4A:
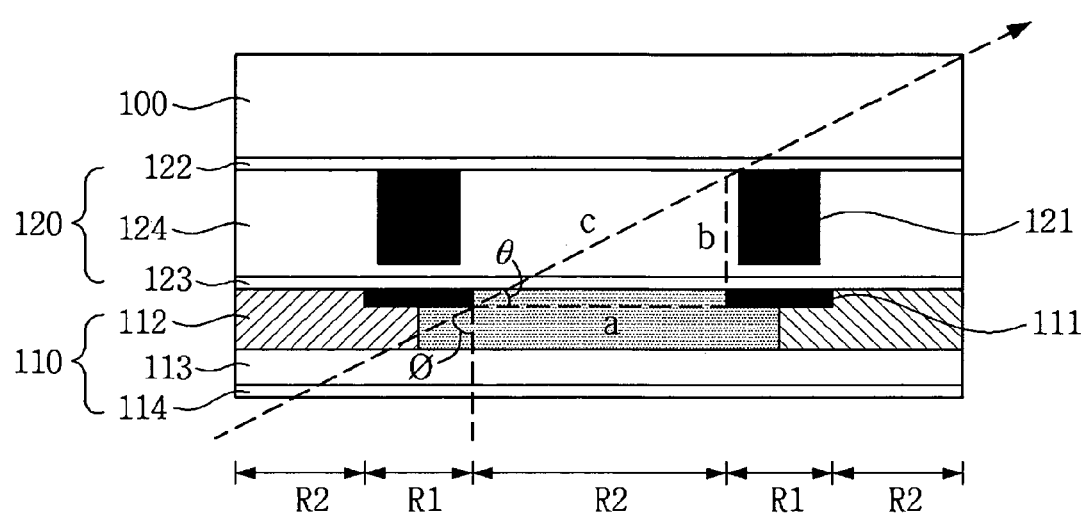
FIGS. 4A to 4C are cross sectional views of an upper substrate according to the first embodiment of the present invention.
Figure 4B:
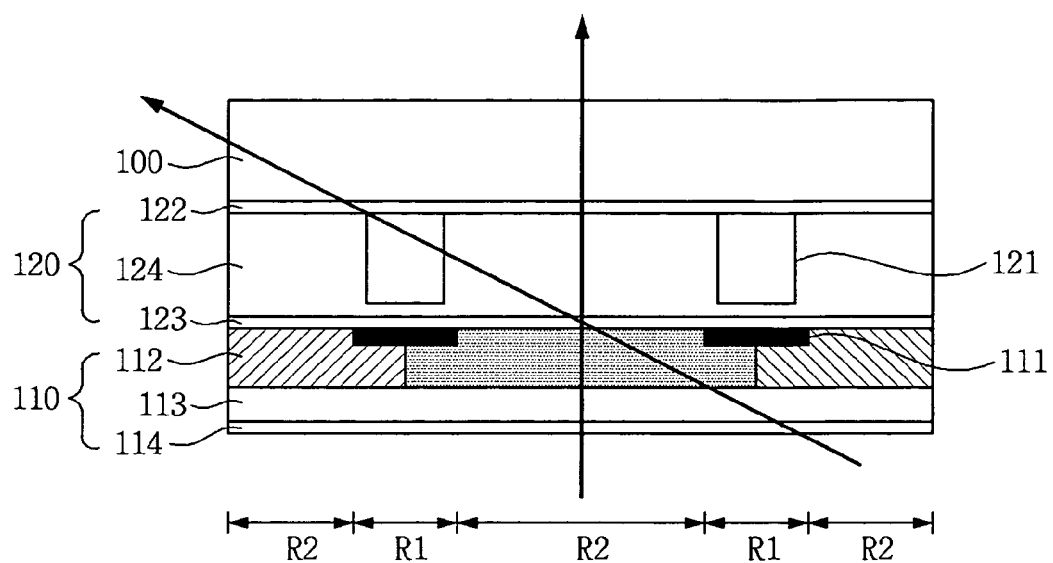
Figure 4C:
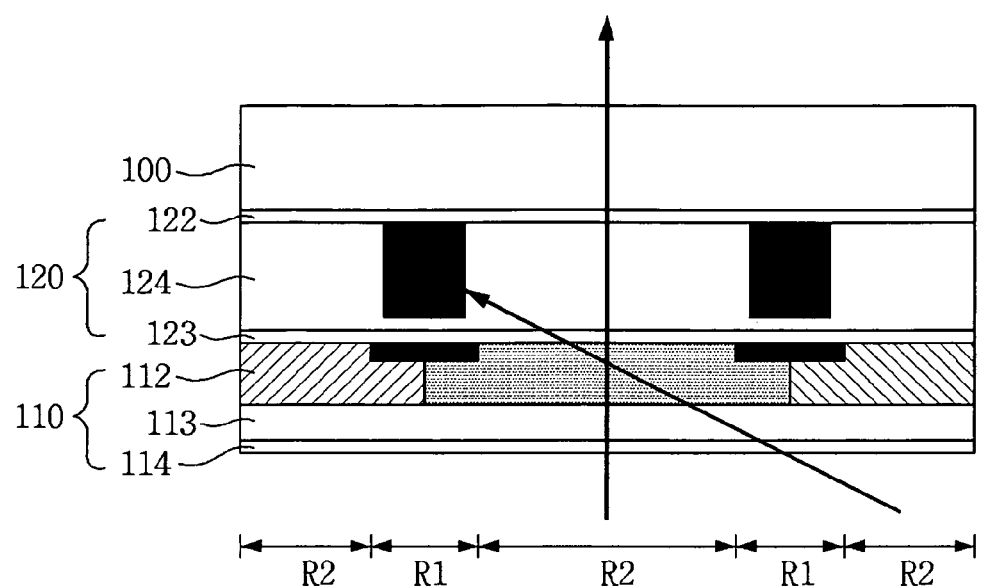

FIGS. 4A to 4C are cross sectional views of an upper substrate according to the first embodiment of the present invention.

FIG. 4A illustrates a case in which an electrochromic pattern 121 of a viewing angle control layer 120 is formed on a first transparent electrode 122. FIGS. 4B and 4C illustrate a viewing angle mode and a narrow angle mode, respectively, depending on a change in the state of the electrochromic pattern 121.

First, referring to FIG. 4A, a display layer 110 and a viewing angle control layer 120 may be formed on an upper substrate 100 according to the first embodiment of the present invention.

The display layer 110 may include a black matrix 111 formed on top of the viewing angle layer 120 for shielding between a plurality of pixel regions P, a color filter 112 formed on top of the black matrix 111, an overcoat layer 113 covering the color filters 112, and an alignment film 114 disposed on top of the overcoat layer 113.

The viewing angle control layer 120 may include an electrochromic device (ECD) that changes the light transmission characteristics by varying the colors of the electrochromic pattern 121 by an electrical oxidation-reduction reaction caused by the application of an electric field and may selectively implement a transparent/opaque state depending on a voltage applied to a first transparent electrode 122 and a second transparent electrode 123.

Such a viewing angle control layer 120 may include first and second transparent electrodes 122 and 123 and an electrochromic pattern 121 and electrolyte 124 formed therebetween.

The first transparent electrode 122 and the second transparent electrode 123 may be spaced apart from each other to face each other so as to have a predetermined gap in a vertical direction.

The electrochromic pattern 121 may be formed on the first transparent electrode 122 or the second transparent electrode 123 and may change its color according to an electric field formed between the first and second transparent electrodes 122 and 123 to selectively implement the wide viewing angle mode and the narrow viewing angle mode. For example, in the wide viewing angle mode, the electrochromic pattern 121 becomes transparent, while in the narrow viewing angle mode, the electrochromic pattern 121 becomes opaque to cut off the viewing angle.

Ions involved in electrochromic reaction of the electrochromic pattern 121 distributed in the electrolyte 124 may fill in the space between the first transparent electrode 122 and the second transparent electrode 123.

In such a display, changes in the state of the viewing angle control layer 120 for selectively implementing the wide viewing angle mode and the narrow viewing angle mode will be described below by varying the light transmission condition according to a voltage applied to the first transparent electrode 122 and the second transparent electrode 123.

When a voltage is applied to the first transparent electrode 122 and the second transparent electrode 123 of the viewing angle control layer 120, the colors of the electrochromic pattern 121 change according to a current flow induced by the applied voltage.

The electrochromic pattern 121 turns into a transparent state that passes visible light or an opaque state that blocks visible light according to the magnitude of the voltage applied to the first transparent electrode 122 and the second transparent electrode 123.

The materials constituting the electrochromic pattern 121 may include inorganic materials or organic materials. The inorganic materials may include $WO_3$, $NiO_xH_y$, $Nb_2O_5$, $V_2O_5$, $TiO_2$, and $MoO_3$, and the organic materials may include polyaniline.

The materials forming the electrochromic pattern 121 are laminated in a barrier shape having a predetermined height in a vertical direction. The lamination structure may be varied according to the type of material used.

For convenience, the operation of the viewing angle control layer 120 will be described hereinafter by way of example of the electrochromic pattern 121 that maintains a transparent state when the lowest voltage (e.g., 0V) is applied and an opaque state when the highest voltage (e.g., 3 to 4V) is applied.

Referring to FIGS. 4B and 4C, the control of the viewing angle will be described below.

FIG. 4A illustrates a structure formed by patterning the electrochromic pattern 121 in regions R1 corresponding to the black matrix 111. As illustrated in FIGS. 4B and 4C, light incident from the front surface is directly passes through, thus there is no reduction in transmittivity directly in front of the substrate.

FIG. 4B illustrates a transparent state of the electrochromic pattern 121, in which the wide viewing angle mode may be implemented because the electrochromic pattern 121 does not affect the viewing angle.

In FIG. 4C, the electrochromic pattern 121 absorbs visible light in wide viewing angle paths, and reduces the transmittivity in wide viewing angle directions without affecting the transmittivity directly in front of the substrate, thereby implementing a narrow viewing angle. That is, when the electrochromic pattern 121 becomes opaque and performs the light absorption function, it serves to block the optical path of wide viewing angles, thereby implementing a narrow viewing angle.

Here, a black matrix 111 may be formed in the shading regions R1 to thus shield between the pixel regions P, and the electrochromic pattern 121 of the viewing angle control layer 120 may be formed in the regions corresponding to the shielding regions R1 where the black matrix 111 is formed, so that the transmittivity of the front surface may be maintained.

A typical black matrix may serve to block light and may be formed of a structure incapable of selecting interception/ transmission, while an electrochromic pattern 121 in the present invention may be able to select a wide viewing angle mode/narrow viewing angle mode by selecting a more transparent/more opaque state, and may serve to block an optical path in the narrow viewing angle mode in which it becomes opaque.

In this manner, reactions of the viewing angle control layer 120 that transmits visible light in a transparent state and absorbs visible light in an opaque state may be controlled by an electric field, thereby controlling the wide viewing angle mode/narrow viewing angle mode.

Moreover, the viewing angle may be adjusted according to the width and height of the electrochromic pattern 121 or black matrix 111, the interval between the electrochromic patterns 121, or the array interval between the black matrices 111.

Referring FIG. 4A again, according to the intervals between the black matrices 111 and the height from the bottom surface of the black matrices 111 to the top surface of the electrochromic patterns 121, the degree of implementation of a narrow viewing angle can be approximated by Mathematical Equation 1:

$$\tan \theta = b/a \qquad \text{[Mathematical Equation 1]}$$

wherein line a denotes a horizontal distance between two black matrices 111 and line b denotes a vertical distance from the top surface of the black matrices 111 to the bottom surface of the electrochromic patterns 121 formed thereunder.

Each θ is an interior angle from line a to oblique line c connecting line a and line b. The viewing angle Ø has a value defined as 90°−θ, and a narrow viewing angle mode results when electrochromic patterns 121 become opaque.

The horizontal distance between the two black matrices 111 is determined according to the type or model of a display, thus it is efficient to design the level of a narrow viewing angle controlling the length of line b that is a vertical height.

Figure 5:
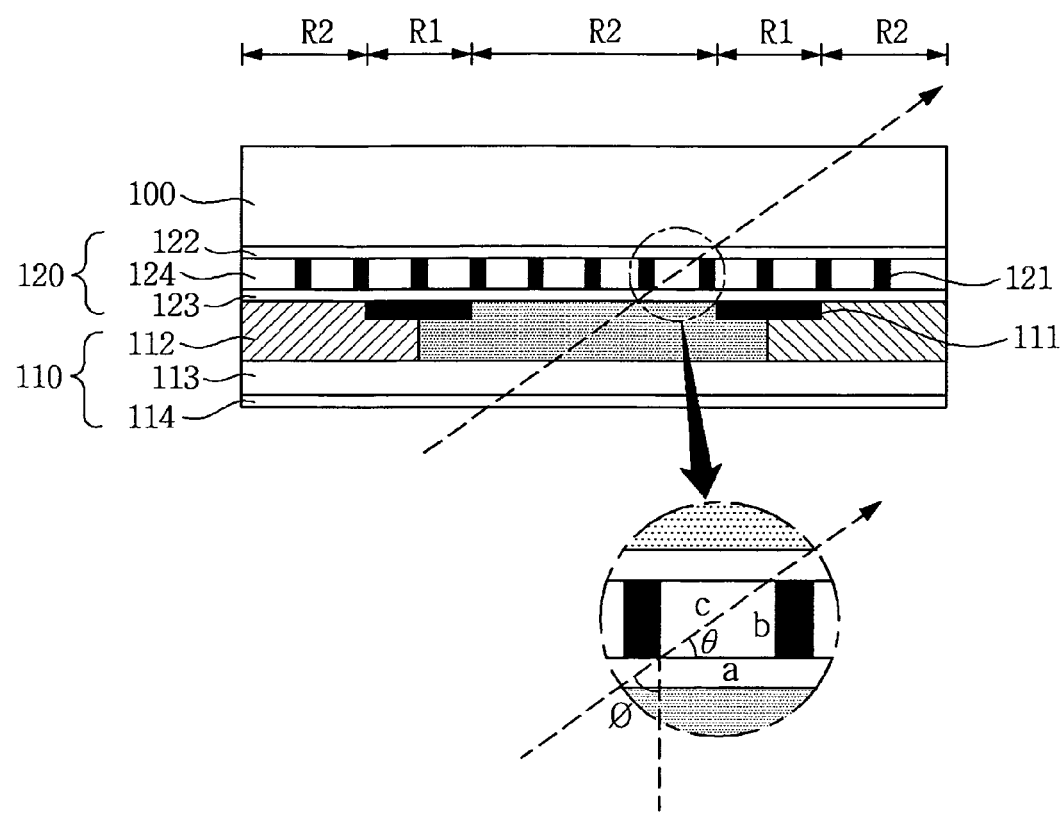
FIG. 5 is a cross sectional view of an upper substrate according to a second embodiment of the present invention.

FIG. 5 is a cross sectional view of an upper substrate according to a second embodiment of the present invention.

Referring to FIG. 5, an electrochromic pattern 121 may be formed at uniform intervals throughout the entire region of the viewing angle control layer 120, i.e., in both the shading regions R1 where a black matrix 111 may be formed and the openings R2 excluding the shading regions R1. The electrochromic pattern 121 may be formed so as to reach from the first transparent electrode 122 to the second transparent electrode 123, to thereby divide a space including an electrolyte 124 between the two electrodes 122 and 123 into a plurality of unit regions.

In the case of FIG. 5, a finer patterning is carried out in order to reduce the height of the electrochromic pattern 121 versus that as shown in FIGS. 4A to 4C. The electrochromic pattern 121 may be formed even in the opening regions R2, as well as the shading regions R1, providing sufficient viewing angle control.

By adapting such a structure, the height of the viewing angle control layer 120 having the electrochromic pattern 121 is reduced, which enables it to reduce the overall thickness of the liquid crystal display. At this point, the viewing angle may be approximated by Mathematical Equation 2 by using the height of the electrochromic pattern 121 and the distance between the electrochromic patterns 121:

$$\tan \theta = b/a \qquad \text{[Mathematical Equation 2]}$$

wherein line a denotes a horizontal distance between two adjacent electrochromic patterns 121 and line b denotes a vertical height from the top surface of the electrochromic patterns 121 to the bottom surface thereof. Each θ is an interior angle from line a to oblique line c connecting lines a and line b. The viewing angle Ø is a value defined as 90°−θ, and a narrow viewing angle mode results when the electrochromic patterns 121 become opaque.

Such a viewing angle control layer 120 may adjust the range of the viewing angle Ø by controlling the length of line a, which is a distance between the electrochromic patterns 121, and the length of line b, which is the height of the electrochromic patterns 121.

Figure 6:
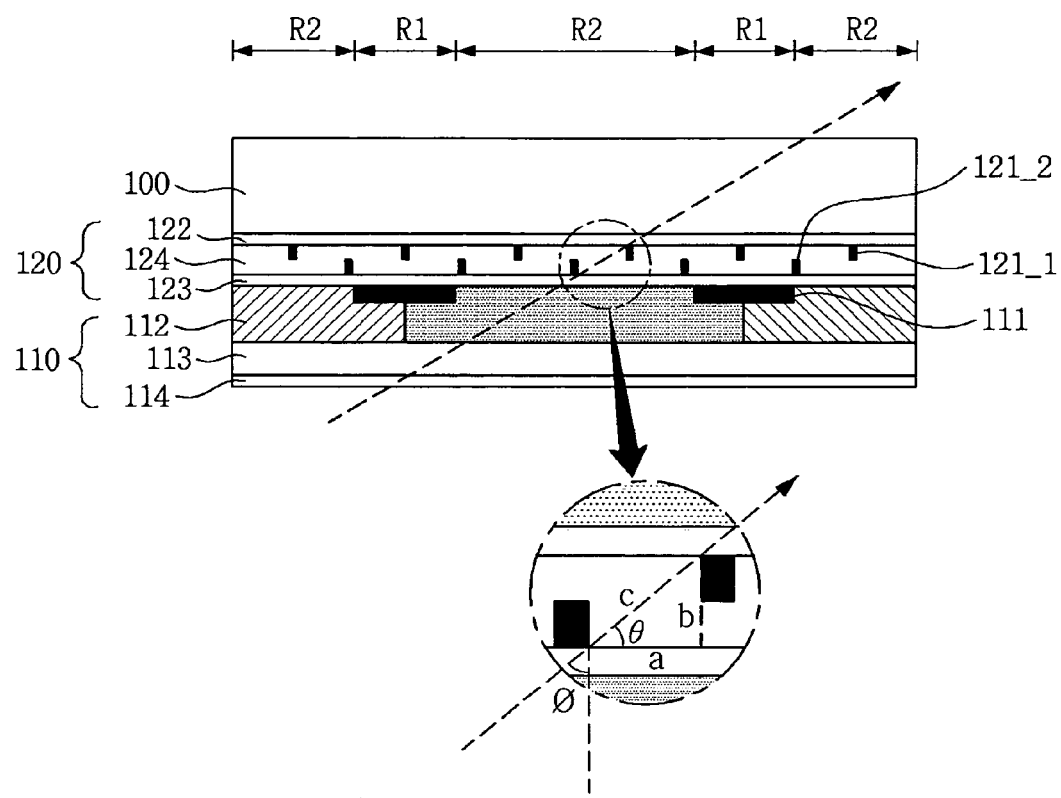
FIG. 6 is a cross sectional view of an upper substrate according to a third embodiment of the present invention.

FIG. 6 is a cross sectional view of an upper substrate according to a third embodiment of the present invention.

Referring to FIG. 6, an electrochromic pattern 121 may be divided into two parts: a reference pattern 121_1 and a spacing pattern 121_2. The reference pattern 121_1 may be formed at uniform intervals on the first transparent electrode 122, while the spacing pattern 121_2 may be formed at uniform intervals on the second transparent electrode 123 so as to be alternate with the reference pattern 121_1.

When the electrochromic pattern 121 is provided in the openings R2 as well as in the shading regions R1, the viewing angle range is reduced, and at the same time, when implementing a narrow viewing angle, the transmittivity in front of the substrate may be reduced to a certain degree due to the presence of electrochromic pattern 121 in the openings R2.

As shown in FIG. 6, the reduction in the transmittivity directly in front of the substrate may be reduced by reducing the width of the electrochromic pattern 121 as much as possible, and patterning the electrochromic pattern 121 into the reference pattern 121_1 and spacing pattern 121_2 on the upper and lower parts, respectively.

When constructing the viewing angle control layer 120 having a structure as shown in FIG. 6, the range of the viewing angle may be approximated by Mathematical Equation 3 by using the intervals of the electrochromic pattern 121, i.e., the distance between the reference pattern 121_1 and the spacing pattern 121_2 and the combined vertical height of the two patterns 121_1 and 121_2:

$$\tan \theta = b/a \qquad \text{[Mathematical Equation 3]}$$

wherein line a denotes a horizontal distance between a spacing pattern 121_2 and an adjacent reference pattern 121_1 and line b denotes a vertical height from the spacing pattern 121_2 to the reference pattern 121_1. θ is an interior angle from line a to oblique line c connecting line a and line b. The viewing angle Ø is a value defined as 90°−θ, and a narrow viewing angle mode results when the reference pattern 121_1 and the spacing pattern 121_2 becomes opaque.

Figure 7:
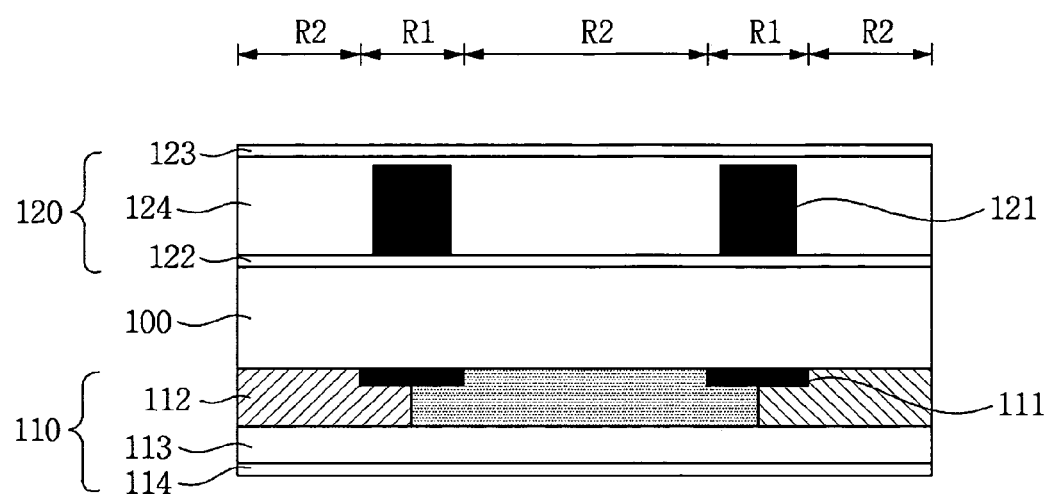
FIG. 7 is a cross sectional view of an upper substrate according to a fourth embodiment of the present invention.

FIG. 7 is a cross sectional view of an upper substrate according to a fourth embodiment of the present invention.

Referring to FIG. 7, a display layer 110 may be formed on one surface of an upper substrate 100, and a viewing angle control layer 120 may be formed on the other surface of the upper substrate 100 which is opposite to the one surface.

The electrochromic pattern 121 may be implemented in various ways where the electrochromic pattern 121 is formed in a barrier shape having a height in a vertical direction.

In the wide viewing angle mode, the electrochromic pattern may maintain a transparent state in order to pass all visible light incident from every direction, while in the narrow viewing angle mode, the electrochromic pattern maintains an opaque state in order to reduce the viewing angle range by blocking visible light incident from wide viewing angles.

Consequently, the more opaque the electrochromic pattern is in the opaque state and the more transparent the electrochromic pattern is in the transparent state, the better the electrochromic pattern 121 may control viewing angle.

The viewing angle control layer 120 may be applied to the front surface or rear surface of the upper substrate 100 or the lower substrate 200 by the principles as shown in FIGS. 4A to 7, or may be applied anywhere in a display after the light leaves the light source. Additionally, a separate substrate for implementing the viewing angle control layer 120 alone may be configured and applied.

In this manner, vertical or lateral viewing angles can be selectively controlled by selectively adapting various shapes of an electrochromic pattern 121 in a vertical or horizontal direction on the upper substrate 100 or the lower substrate 200.

FIGS. 8A to 8D are process views for explaining a manufacturing method of a liquid crystal display according to a first embodiment of the present invention.

Figure 8A:
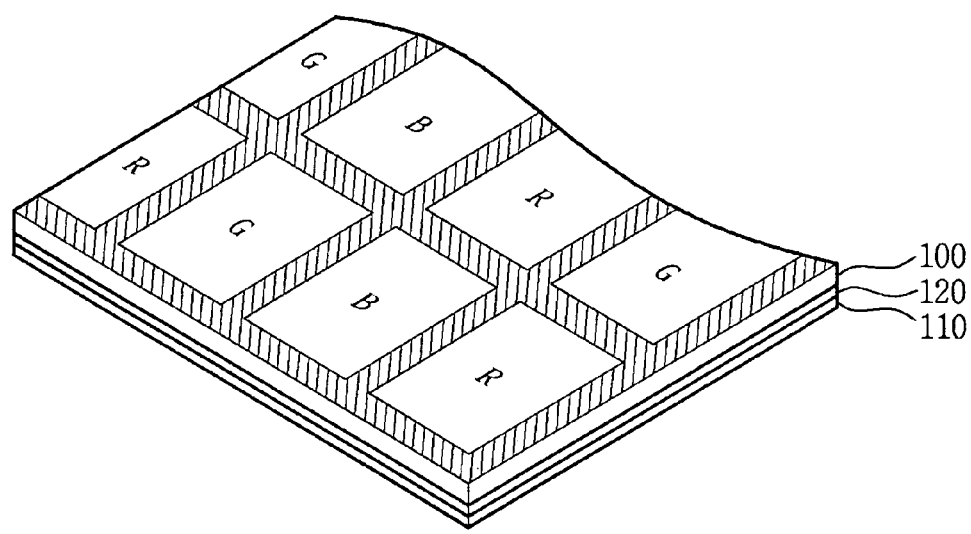
FIGS. 8A to 8D are process views for explaining a manufacturing method of the liquid crystal display according to the first embodiment of the present invention.

First, as illustrated in FIG. 8A, a viewing angle control layer 120 may be formed on an upper substrate 100, and a display layer 110 may be formed on top of the viewing angle control layer 120. The display layer 110 for displaying images, and the viewing angle control layer 120, parts of which may be opaque or transparent according to the magnitude of an applied voltage, adjusts the transmission/interception of light incident from the sides of the display layer 110.

Figure 8B:
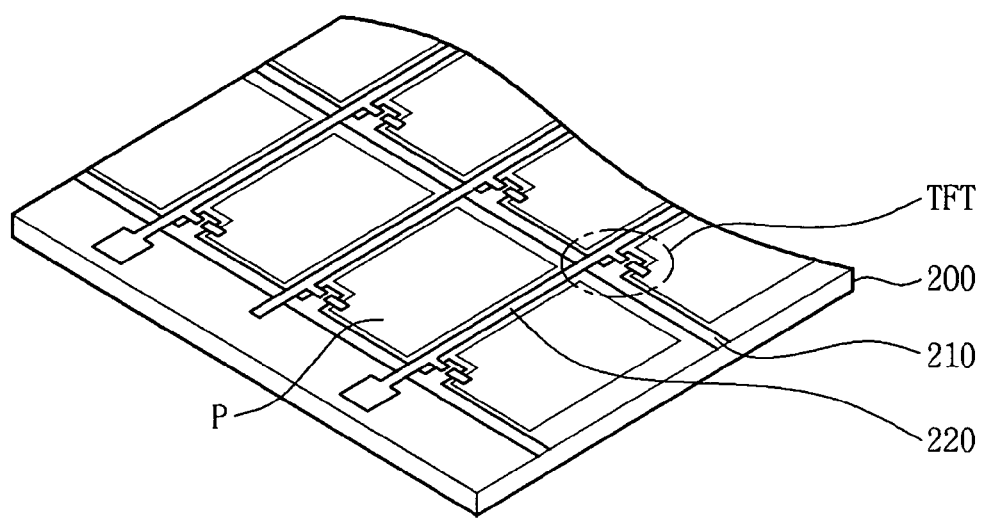

Next, as illustrated in FIG. 8B, a plurality of pixel regions P may be formed on the lower substrate 200 arranged in a matrix. Each of the pixel regions P is defined by gate lines 210 and data lines 220 crossing each other.

Figure 8C:
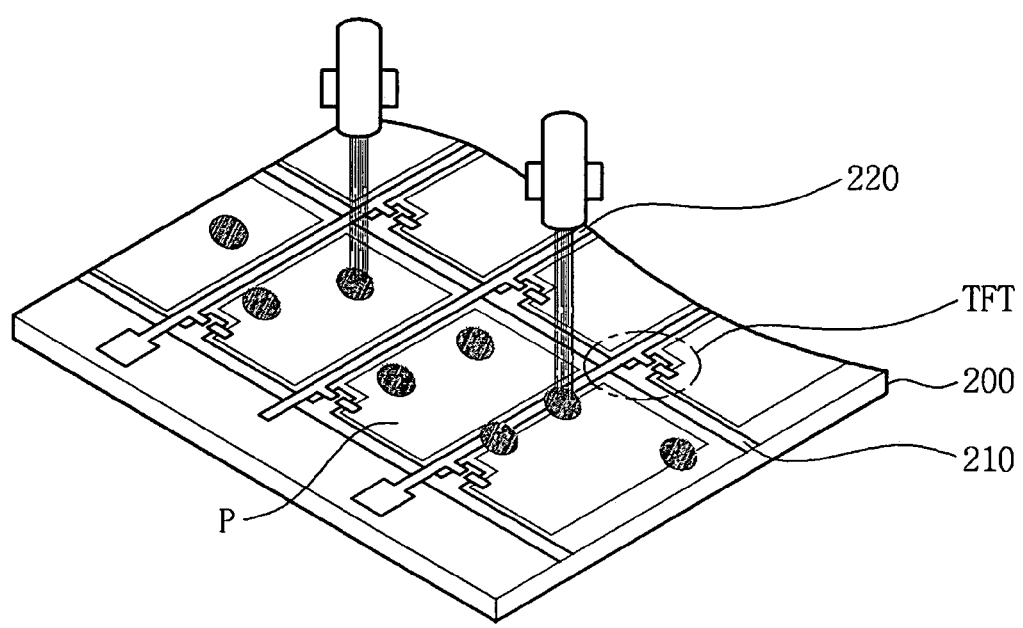
Figure 8D:
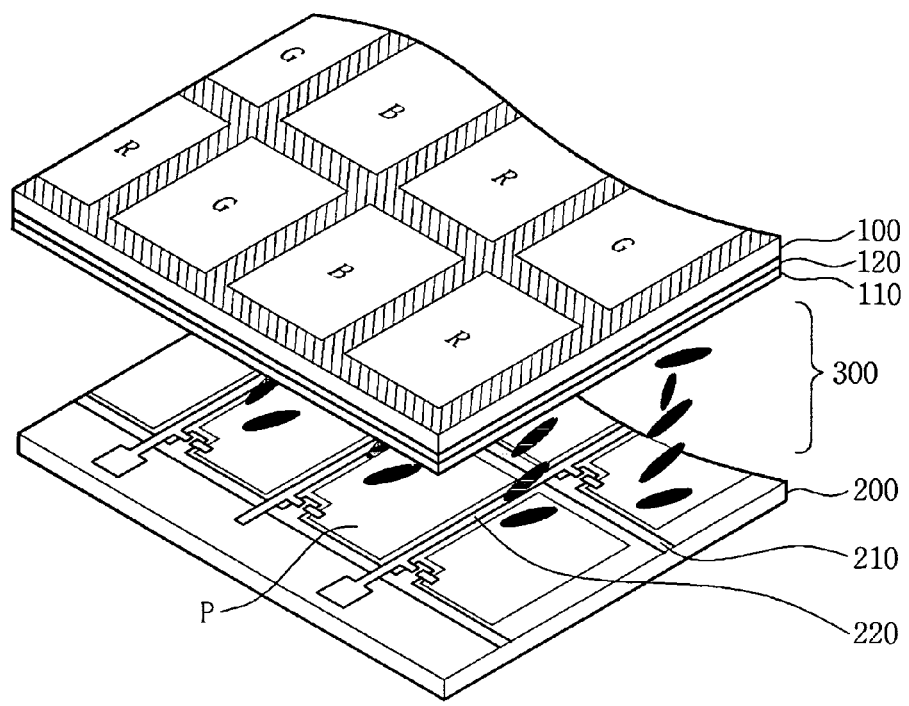

Next, as illustrated in FIGS. 8C and 8D, a liquid crystal material may be dropped on the lower substrate 200 to form a liquid crystal layer 300, and thereafter the upper substrate 100 and the lower substrate 200 may be attached to each other with the liquid crystal layer 300 disposed therebetween. The substrate on which the liquid crystal material is dropped may also be an upper substrate 100.

In FIG. 8A, the viewing angle control layer 120 may be formed in such a manner to include an electrochromic pattern 121 and an electrolyte 124 between a first transparent electrode 122 and a second transparent electrode 123 that are spaced apart with a gap in a vertical direction as illustrated in FIG. 4A.

The materials forming the electrochromic pattern 121 may include $WO_3$, $NiO_xH_y$, $Nb_2O_5$, $V_2O_5$, $TiO_2$, and $MoO_3$, polyaniline, etc.

The range of viewing angle to be implemented in the narrow viewing angle mode for the display layer 110 is determined by the width and height of an electrochromic pattern 121, and the intervals between adjacent two electrochromic patterns 121, the shape of the electrochromic pattern 121 and the like.

For example, as shown in FIG. 5, the viewing angle in the narrow viewing angle mode is defined as Ø, and is determined by the horizontal interval between two electrochromic patterns 121, and the vertical height b.

A viewing angle control layer 120 including an electrochromic pattern 121 may be constructed in various forms as described in detail in FIGS. 4A to 7.

For example, as illustrated in FIGS. 4A to 4C, an electrochromic pattern 121 may be formed under a black matrix 111, corresponding to the shading regions R1 disposed between the pixel regions P, i.e., the regions where the black matrix 111 is formed.

Furthermore, as illustrated in FIG. 5, an electrochromic pattern 121 is disposed at uniform intervals over the entire regions of the viewing angle control layer 120, so that a space between a first transparent electrode 122 and a second transparent electrode 123 may be divided into a plurality of unit regions. Alternately, as shown in FIG. 6, the electrochromic pattern 121 may be divided into a reference pattern 121_1 on the first transparent electrode 122 and a spacing pattern 121_2 on the second transparent electrode 123 so that they may alternate with each other.

Alternately, as illustrated in FIG. 7, a display layer 110 is formed on one surface of the upper substrate 100, and a viewing angle control layer 120 is formed on the other surface of the upper substrate 100 which is opposite to the one surface.

The thus-described color filter substrate, liquid crystal display, and manufacturing method thereof according to the present invention may efficiently control the interception/transmission of light and the viewing angle characteristics by using an adjustable transmissivity material, including an electrochromic material whose transparent/opaque state is varied by an electric field.

While the embodiment of the present invention has been described in detail with reference to the drawings, it will be understood by those skilled in the art that the invention can be implemented in other specific forms without changing the technical spirit or essential features of the invention.

Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A color filter substrate, comprising:
    a display layer includes a plurality of openings separated from each other, shading regions disposed between the openings that displays images, color filters in the openings, and a black matrix in the shading regions; and
    a viewing angle control layer with an electrochromic pattern that adjusts the transmission/interception of light incident from wide viewing angles depending on a magnitude of a voltage applied to the electrochromic pattern, wherein the viewing angle control layer includes:
    a first transparent electrode and a second transparent electrode spaced apart from each other so as to have a predetermined gap in a vertical direction;
    the electrochromic pattern on the first transparent electrode, whose transmissivity changes according to an electric field formed between the first and second transparent electrodes; and
    an electrolyte with ions involved in an electrochromic reaction of the electrochromic pattern that fills the space between the first transparent electrode and the second transparent electrode.

2. The color filter substrate of claim 1, wherein the position of the electrochromic pattern corresponds to the shading regions where the black matrix is formed.

3. The color filter substrate of claim 1, wherein the electrochromic pattern is formed at uniform intervals throughout the entire viewing angle control layer, and the space between the first transparent electrode and the second transparent electrode is divided into a plurality of unit regions by the electrochromic pattern.

4. The color filter substrate of claim 1, wherein the electrochromic pattern includes: a reference pattern with uniform intervals on the first transparent electrode; and a spacing pattern with uniform intervals on the second transparent electrode so as to alternate with the reference pattern.

5. The color filter substrate of claim 1, wherein the display layer and the viewing angle control layer are formed on opposite surfaces of a substrate.

6. A liquid crystal display, comprising:
an upper substrate having a display layer that displays images and a viewing angle control layer whose transmissivity changes depending on the magnitude of a voltage applied thereto that adjusts the transmission/interception of light incident from wide viewing angles;
a lower substrate facing the upper substrate having a plurality of pixel regions arranged in a matrix; and
a liquid crystal layer between the upper substrate and the lower substrate, wherein the viewing angle control layer includes:
a first transparent electrode and a second transparent electrode spaced apart from each other so as to have a predetermined gap in a vertical direction;
an electrochromic pattern formed on the first transparent electrode, whose transmissivity changes according to an electric field formed between the first and second transparent electrodes; and
an electrolyte with ions involved in an electrochromic reaction of the electrochromic pattern that fills the space between the first transparent electrode and the second transparent electrode.

7. The liquid crystal display claim 6, wherein the viewing angle control layer is switched between a wide viewing angle mode and a narrow viewing angle mode according to a voltage applied to the first transparent electrode and the second transparent electrode, and the electrochromic pattern becomes transparent in the wide viewing angle mode to transmit light from every direction and becomes opaque in the narrow viewing angle mode to intercept light from a wide angle direction to thereby reduce a viewing angle.

8. The liquid crystal display claim 6, wherein the viewing angle is adjusted according to the width and height of the electrochromic pattern and the intervals of the electrochromic patterns.

9. The liquid crystal display of claim 6, wherein the electrochromic pattern includes one of WO3, NiOXHY, Nb2O5, V2O5, TiO2, and MoO3, and polyaniline.

10. The liquid crystal display of claim 6, wherein the display layer includes a black matrix in the shading regions that shields the pixel regions, and the electrochromic pattern corresponds to the shading regions where the black matrix is located.

11. The liquid crystal display of claim 10, wherein when the horizontal interval between first and two adjacent black matrices is defined as a, the height from the bottom surface of the second black matrix to the top surface of the electrochromic pattern corresponding to the second black matrix is defined as b, and angle $\theta$ is defined such that $\tan\theta=b/a$ is satisfied, wherein a viewing angle in the narrow viewing angle mode is defined as $\emptyset=90°-\theta$, and wherein the value of b is controlled to adjust the viewing angle.

12. The liquid crystal display of claim 6, wherein the electrochromic pattern is formed at uniform intervals throughout the viewing angle control layer, and the space between the first transparent electrode and the second transparent electrode is divided into a plurality of unit regions by the electrochromic pattern.

13. The liquid crystal display of claim 12, wherein when the horizontal interval between first and two adjacent electrochromic patterns is defined as a, the height of the second electrochromic pattern is defined as b, and angle $\theta$ is defined such that $\tan\theta=b/a$ is satisfied, wherein a viewing angle in the narrow viewing angle mode is defined as $\emptyset=90°-\theta$, and wherein the value of a and the value of b are controlled to adjust the viewing angle.

14. The liquid crystal display of claim 6, wherein the electrochromic pattern includes: a reference pattern with uniform intervals on the first transparent electrode; and a spacing pattern with uniform intervals on the second transparent electrode so as to alternate with the reference pattern.

15. The liquid crystal display of claim 12, wherein when the horizontal interval between a first spacing pattern and a first reference pattern adjacent to the first spacing pattern is defined as a, the height from the first spacing pattern to the first reference pattern is defined as b, and angle $\theta$ is defined such that $\tan\theta=b/a$ is satisfied, wherein a viewing angle in the narrow viewing angle mode is defined as $\emptyset=90°-\theta$, and wherein the value of a and the value of b are controlled to adjust the viewing angle.

16. The liquid crystal display of claim 6, wherein the display layer is on one surface of the upper substrate, and the viewing angle control layer is on the opposite surface of the upper substrate.

17. A manufacturing method of a liquid crystal display, comprising steps of:
a) forming a display layer on an upper substrate that displays images and a viewing angle control layer whose transmissivity changes depending on the magnitude of a voltage applied thereto that adjusts the transmission/interception of light incident from wide viewing angles, wherein the viewing angle control layer is formed so as to include a first transparent electrode and a second transparent electrode spaced apart from each other with a gap in a vertical direction and an electrochromic pattern and an electrolyte between the first and second transparent electrodes;
b) forming on a lower substrate a plurality of pixel regions arranged in a matrix; and
c) forming a liquid crystal layer between the upper substrate and the lower substrate, and assembly of the upper substrate and the lower substrate.

18. The method of claim 17, wherein the width and height of the electrochromic pattern and the intervals between the electrochromic patterns are selected to limit the viewing angle of the liquid crystal display to a desired range.

19. The method of claim 17, wherein the electrochromic pattern includes one of WO3, NiOXHY, Nb2O5, V2O5, TiO2, and MoO3, and polyaniline.

20. The method of claim 17, wherein the electrochromic pattern is formed so as to correspond to the shading regions disposed between the pixel regions.

21. The method of claim 17, wherein the electrochromic pattern is formed at uniform intervals throughout the entire viewing angle control layer, and the space between the first transparent electrode and the second transparent electrode is divided into a plurality of unit regions.

22. The method of claim 17, wherein the electrochromic pattern includes: a reference pattern formed at uniform intervals on the first transparent electrode; and a spacing pattern formed on the second transparent electrode so as to alternate with the reference pattern.

23. The method of claim 17, wherein the step a) is a step in which the display layer is formed on one surface of the upper substrate and the viewing angle control layer is formed on the opposite surface of the upper substrate.

* * * * *